United States Patent Office 2,980,655
Patented Apr. 18, 1961

2,980,655

POLYMERIZATION PROCESS

John A. Glass, Akron, and John F. Jones, Cuyahoga Falls, Ohio, assignors to The B. F. Goodrich Company, New York, N.Y., a corporation of New York No Drawing. Filed Aug. 27, 1957, Ser. No. 680,637

12 Claims. (Cl. 260—80.3)

The present invention relates generally to the polymerization of carboxyl-containing monomers. More particularly, the invention relates to the polymerization in solution of a monomeric material containing an acrylic acid with the production of solid, hydrophilic polymers.

Acrylic acid and other substituted acrylic acids can, in general, be polymerized either in aqueous solution or organic solution. When the monomeric mixture so polymerized predominates in the acrylic acid constituent, the polymer produced in the aqueous system will be dissolved or highly swollen in character. In contrast, polymerization of the same monomers in an organic medium will usually produce a solid or insoluble polymer which is more or less swollen by the organic materials present. In both the all-organic and aqueous systems great difficulty is encountered in carrying the polymerization to high solids levels, because in each case the reaction mixture becomes too viscous to stir making reaction control highly uncertain.

The production of high solids reaction mixtures in water, of course, is limited because of the well-known thickening action of polymers such as polyacrylic acid. In organic media the resin slurry particles may be so swollen as to absorb a major proportion of the liquid present. The latter condition can occur in many solvents at only about 8 to 10% total solids, forming a slurry too viscous to be stirred.

Moreover, polymerization in the all-organic medium as described above involves other operating difficulties. For example, the polymer slurry usually obtained is difficult to filter, centrifuge or otherwise effect a separation between solid and liquid. The polymer filter cake may also be highly charged such that the finer material is easily suspended in air. The polymer also may contain a high proportion of fines and evidence a quite low bulk density. Moreover, the filter cake will contain such a high proportion of absorbed solvent as to impose an abnormal load on final drying equipment.

It is an important object of this invention, therefore, to provide a process capable of producing solid acrylic acid type polymers in the form of fluid slurries in an organic medium. Another object is to provide such a process capable of operation at solids levels of at least about 12%, and preferably above about 18 to 20%. Another object is to provide a process capable of producing solid polymers having a higher bulk density, lower solvent content and having a larger effective particle size so as to be easier to handle in filtering, drying and packaging operations. Still other objects and advantages will become apparent in the description to follow.

In accordance with the present invention it has been found that a monomeric material containing a substantial proportion of an alpha-beta monoolefinic monocarboxylic acid can be polymerized to form a solid polymer with low slurry viscosity in a mixed organic medium, in which the monomeric material is soluble but in which the polymer is insoluble, containing (1) an aromatic hydrocarbon containing less than about 10 carbon atoms and (2) one or more organic additives which is miscible with the hydrocarbon, is a solvent for the monomeric material, and has a greater polar character than the aromatic constituent. The proportion of additive (2) in the mixed polymerization medium should be sufficient to deswell the resulting polymer particles by at least about 5%. Thus, the process comprises the use of a mixed polymerization medium wherein a polar organic additive is present in sufficient proportion to exert a deswelling action on the polymer as formed. The product is a fluid slurry in which the particles evidence a larger apparent size and greater density. Such particles do not appear to be statically charged to the same degree as comparable particles made in a hydrocarbon medium without a polar additive. Heat removal and reaction control are much improved because of increased fluidity. Filtration by any of the commonly-employed techniques also is much improved and losses of fines are reduced.

The polar organic additives, per se, ordinarily have a strong tendency to swell such polymers. When combined with an aromatic hydrocarbon, however, many polar organic substances have been found to exert a strong deswelling action. The polymer in these cases will contain at least 50 to 75% less absorbed solvent and will be correspondingly more dense. Where formerly operation at a maximum of 8 to 10% by weight solids levels was common, now fluid slurries at 25 to 30% or more solids are commercially feasible in the mixed solvent medium. It is possible also to select a mixed solvent medium which will produce dense, macro particles resembling the so-called "pearl" or bead style polystyrene commonly obtained in the aqueous suspension polymerization of styrene.

Other surprising effects are shown by the process of this invention. When producing cross-linked acrylic acid type polymers, for example, the mixed solvent medium seems to exert considerable influence on the structure of the polymer produced. For example, with certain polyalkenyl polyether type cross-linking monomers defined below, relatively less cross-linking monomer is required with, than is required without, the polar co-solvent. This may simply be the effect of a considerably increased molecular weight (i.e. less cross-linking required to bind the longer chains into a gel). It is sometimes necessary to reduce the proportion of cross-linking monomer by as much as 70 or 80% in order to produce a polymer having the desired or equivalent aqueous or rheological characteristics. It is also noticed that "graininess" or discontinuity of gel (at low resin concentrations) sometimes can be observed in polymers made in a mixed solvent medium adjusted for maximum solids content. The cause of the latter is not known although the phenomenon is valuable in resins intended for certain uses and disadvantageous in others. It can be avoided by selection of suitable solvent proportions.

The mixed solvent medium of this invention contains as its main constituent an aromatic hydrocarbon, those containing less than about 10 carbon atoms being preferred because of their generally lower boiling points and ease of removal from the polymer. Thus, benzene, toluene and xylene are best, not only because of their lower boiling points, but also because of low cost and ready availability. Benzene is most preferred.

The polar additive or co-solvent material should be an organic liquid which has the qualifications:

(1) Miscibility with the remainder of the reaction medium and no ability to dissolve or break-down the insoluble polymer;

(2) It should be more polar in character than the aromatic hydrocarbon constituent;

(3) It should not react with or associate with the monomer or polymer to any appreciable extent to form compounds or complexes which would be present in the product;

(4) It should be readily removable from the product, preferably by mere evaporation; and (5) It should have the peculiar ability to deswell, rather than swell, the polymer, at least to the extent of 5%, when in admixture with the aromatic hydrocarbon.

Not all organic liquids have these qualities. For example, ethyl acetate in benzene does not deswell the polymer. There are, however, many organic liquids that improve slurry fluidity. For example, carboxylic acids, and especially those lower aliphatic monocarboxylic acids containing not more than about 4 carbon atoms, have this characteristic. Another useful, large sub-class of co-solvents is the alcohols, particularly the lower aliphatic monohydric alcohols containing not more than about 4 carbon atoms. Acetone and other ketones may also be utilized. Ethers, and particularly the more volatile cyclic ethers such as dioxane and tetrahydrofurane, are also very effective. Aldehydes may also be employed as may polymerized forms of alkylene oxides. Acetonitrile is another good solvent which is very effective in this process. The greater number of the materials found most effective posses the common characteristic of containing carbon-bound oxygen. Of course, one or more of any of these and others can be employed. Lower aliphatic, monohydric alcohols containing not more than about 4 carbon atoms are preferred. A simple screening test for determining the deswelling ability of a given organic liquid is to add the organic liquid to a hydrocarbon slurry of polymer, agitate until equilibrium is attained and then determine the swelling index, as described below.

The proportion of the organic polar additive in the mixed solvent medium will vary considerably depending on the particular aromatic hydrocarbon employed, to some extent on the monomer composition, and, to a great extent, on the polar additive itself. In most cases the deswelling action increases with the proportion of polar additive up to a point and then swelling action begins to be encountered again.

Practical commercial operations indicate that in order to offset the increased cost of the handling, separation and recovery of a mixed solvent, as compared to a single-component medium, that certain minimal increases in slurry solids content be obtained. In these terms, the mixed solvent polymerization medium must be capable of deswelling the polymer formed therein by at least 5% in order to make possible operation at an increase in solids level of at least 2 or 3% by weight. With a given monomeric system such as acrylic acid in a medium made up of benzene as the aromatic hydrocarbon and methanol or ethanol as the polar organic additive, this means that at least sufficient alcohol or other polar additive should be employed to operate at about 12% by weight solids content. Without alcohol, acrylic acid polymerizes in benzene to a thick slurry in the range of 8 to 10% solids level.

A more convenient manner of defining the deswelling action of the mixed polymerization medium is in terms of a swelling index for the polymer. As used herein the latter term means the ratio of a given weight of solvent-swollen polymer to the weight of the same polymer when filtered and dried to constant weight according to a standard procedure. With the system acrylic acid/cross-linking agent/benzene the natural swelling index of the polymer is in the range of about 5.2 to about 5.5 when operating at a solids level of 10% by weight or below. Under these same conditions linear (or soluble) polyacrylic acid has a swelling index of about 4.9. In these systems sufficient polar organic additive must be added to reduce the swollen condition of the polymer by at least 5% (i.e. reduce swelling index by at least 5% to a value of about 5.0 to 5.25 for the cross-linked polymer or about 4.65 for the linear polymer) either to effect a noticeable improvement in slurry fluidity or to make possible operation at the 12% by weight solids level. With the lower aliphatic, monohydric alcohols containing not more than about 4 carbon atoms, such as methanol or ethanol, this means (with benzene as the aromatic hydrocarbon) at least about 0.5 to 1% by volume of methanol or at least about 1.5% by volume of ethanol need be utilized to achieve a noticeable improvement in slurry fluidity. More ethanol or methanol must be employed to effect truly substantial increases in solids levels. For example, in the acrylic acid/benzene/methanol system as little as about 3 or 4 volume percent of methanol will make possible the production of fluid, workable slurries at the 20% (by weight) solids level. Ethanol is slightly less efficient than methanol because about 4 to 5 volume percent of ethanol are sometimes required for fluid slurries at the 20% solids level. At these levels the swelling index will have been reduced from 5.2 to 5.5 down to 3.0 to 3.5. Polymers having swelling indices of the latter order contain at least 40 to 50% less absorbed solvent. In most cases, best results are obtained with polymers having swelling indices below about 4.5. With acrylic acid polymerized in toluene or xylene, to form the linear homopolymer the addition of as little as 3 to 6% by volume of methanol or ethanol reduces the swelling index of polyacrylic acid to 2.8 to 3.5 and produces fluid slurries at the 12 to 20% solids levels. About 6% by volume of acetonitrile in benzene permits the production of practical slurries at the 20% solids level.

Similarly, acetic acid can be employed as the more polar organic additive. Slightly larger amounts are required than of the highly effective alcohols. For example, 3.5 to 5% acetic acid will reduce the swelling index of the polyacrylic acid to 4.76 to 4.92 at the 12% solids levels while 7 to 10% will reduce swelling index at 20% solids to 3.6 to 3.7.

Further, when tetrahydrofurane is employed as the polar additive about 2.5 to about 5% volume are required with the acrylic acid/benzene system at 12% solids level and from about 5 to about 10% at the 20% solids level. With the methacrylic acid/benzene system from about 7 to about 10% of tetrahydrofurane will reduce the swelling index to about 3.5. Dioxane is similar in effect.

In general, in order to produce a fluid slurry at higher solids levels in the range of 20 to 30%, it is usually necessary to reduce the swelling index (polyacrylic acid in benzene) below about 4 although workable slurries may sometimes be obtained at these solids levels with slightly higher swelling indices.

In the process of this invention, further improvements in slurry fluidities obtained in the mixed solvent system are achieved when the medium is vigorously agitated. It is believed that vigorous agitation assists in compacting the polymer particles and may even form agglomerates or larger particles by coalescence of small particles. Any reduction in total polymer surface area is advantageous in this type of a system so long as flocculent masses are not formed.

The process of this invention can be employed to effect the polymerization of monomeric materials containing, as an essential ingredient, a polymerizable, monocarboxylic acid containing but one olefinic double bond which is present in an alpha-beta position with respect to a carboxyl group, thusly:

$$-\overset{|}{C}=\overset{|}{C}-COOH$$

In the alpha-beta unsaturated acids the close proximity of the strongly polar carboxyl group has a strong activating influence rendering the acid readily polymerizable. Olefinically-unsaturated acids of this class include the acrylic acids such as acrylic acid itself, methacrylic acid, ethacrylic acid, alpha-chloro acrylic acid, alpha-cyano acrylic acid, alpha-phenyl acrylic acid, itaconic acid, and others. The preferred carboxylic monomers employed in this invention are the mono-olefinic acrylic acids of the general structure

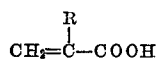

wherein R is a substituent selected from the class consisting of hydrogen, halogen, hydroxyl, lactone, lactam, and the cyanogen (—C≡N) groups, monovalent alkyl radicals, monovalent aryl radicals, monovalent aralkyl radicals, monovalent alkaryl radicals and monovalent cycloaliphatic radicals. Of this broad class acrylic acid itself is most preferred because of the superiority of its polymers, its greater ease of polymerization, ready availability and modest cost.

Although it has not been mentioned heretofore, it has been found that other types of polymerizable acids do not respond to the action of the mixed polymerization medium of this invention. For example, the polymerization of monomeric materials containing maleic anhydride does not respond to the presence of the polar organic additive and it is very difficult to obtain practical slurries, even at 8 to 10% solids levels.

The monomeric material employed in the practice of the method of this invention may also contain, in addition to the essential polymerizable acid monomer, other monomeric materials. For example, a very important class of polymers are the cross-linked polyacrylic acid type wherein an acrylic acid is lightly cross-linked so as to be insoluble in water and organic solvents yet highly swellable in water so as to form a mucilaginous composition. Such polymers are useful as superior replacements for gum tragacanth, gum arabic, gum karaya and other naturally-occurring more or less insoluble gum-like substances conventionally employed as bodying and suspending agents. Such high swelling polymers are useful in various mucilaginous or coloidal gel applications such as in dentrifrices, surgical and medicinal jellies, creams and ointments, cosmetics, and printing paste thickeners, and as bulk laxatives, carrying agents, ion-exchange resins, and other materials for use in treatment of various disorders of the human and animal gastro-intestinal tract. Corresponding polymers made with significantly higher amounts of cross-linking agent are hard, insoluble and dimensionally-stable polymers having very high ion-exchange capacity.

The cross-linking agents which may be employed in producing the insoluble, high-swelling polymers include any material capable of co-polymerization with the acid monomer and containing at least two polymerizable olefinic double bonds per molecule. Such cross-linking materials may range from monomeric to polymeric in form and may contain 3, 6, 8, 10 or even more polymerizable groupings per molecule, including for example, divinyl benzene, 1,8-nonadiene, ethylene glycol diacrylate, ethylene glycol dimethacrylates, divinyl ether, divinyl ketone, polyalkenyl polyethers such as the polyallyl and polyvinyl ethers of oligosaccharides such as the polyallyl polyethers of sucrose, pentaerythritol and the like, diallyl acrylamide, hexaallyl trimethylene trisulfone, the solvent-soluble low polymers of conjugated diene hydrocarbons such as polybutadiene, polyisoprene, and the like, polyallyl and polyvinyl silanes such as tetravinyl silane, tetraallyl silane, and the like, triallyl cyanurate, and many, many others.

Since both cross-linked high-swelling and the cross-linked, dimensionally-stable (low swelling) ion-exchange type resins are subjected to hydrolyzing conditions, it is preferred to utilize cross-linking monomers which will form cross-links not susceptible to scission under strongly acidic and strongly basic conditions. Such monomers are the hydrocarbon type such as divinyl benzene; the tetravinyl and tetraallyl silanes; the soluble low molecular weight diene polymers; and the polyalkenyl polyether type monomers. The use of the polyalkenyl polyethers in acrylic acid type polymers, is disclosed most fully in U.S. Patent No. 2,798,053, issued July 2, 1957. Briefly, the polyalkenyl polyethers containing an average of more than two $CH_2$=C groups per molecule are prepared by known techniques from polyhydric alcohols, and particularly from the class known as oligosaccharides containing from one to four monosaccharide units per molecule, from the reduction products of the oligosaccharides such as the alcohols, aldo-alcohols, and from the oligosaccharide oxidation products which retain the original saccharide chain such as the sugar acids, the keto-acids, the aldo-acids, and the like. Illustrative saccharide starting materials are the mono-saccharides such as glucose, galactose, fructose, sorbose, rhamnose, and the like; disaccharides such as sucrose, arabinose, maltose, lactose and the like; and trisaccharides such as reffinose and others. The disaccharide, sucrose, is much preferred because of its readily availability and its ability to produce polyethers of great reactivity with carboxylic monomers.

The proportion of the cross-linking monomer required to produce the insoluble but highly hydrophilic, high-swelling polymers is very small. Especially in this process, since as indicated above, the mixed solvent system seems to favor more efficient use of the cross-linker. When using a polyallyl polyether of sucrose containing from 3 to 6 allyl ether groupings per molecule, only about 0.05 to 2.0% by weight is required. Generally, less than 3% by weight of any of the more efficient cross-linking monomers will suffice. For the hard, dimensionally-stable or ion-exchange type of polymer, amounts of cross-linking monomer ranging from about 5 to about 30% by weight, more preferably 10 to 20% by weight, will be employed. In a two-component monomeric mixture, this means that the remainder of the mixture will be the carboxylic acid monomer.

When it is desired to produce multi-component polymers substantial proportions of still other monomers can be employed. However, since the swelling capacity of the high swelling cross-linked polymers, and also the ion-exchange capacity of the dimensionally-stable polymers, are dependent on the carboxyl-content of the polymer, it is generally desirable to utilize as much of the carboxylic monomer or monomers and as little of the other monomeric constituents as is consistent with the other desirable properties. In these multi-component polymers or interpolymers, it is most desirable that the carboxylic acid monomer or monomers should not be less than 25%, preferably not less than 40%, by weight of the total monomeric mixture. Better yet, it is more preferred that the carboxylic acid monomer predominate (i.e. 50 mol percent or more). Thus, interpolymers can be produced containing from 25 to 95% by weight of a carboxylic monomer of the class described, 0 to 30% of a cross-linking agent (optional), and from about 5 to about 75% by weight (total) of one or more other monoolefinic monomers. Such other monomers include styrene, the chloro- and ethoxy-styrenes, methyl styrenes, acrylamide, n-methyl acrylamide or other acrylamide-type monomer, acrylonitrile, acrylic esters such as methyl acrylate, methyl vinyl ether, ethyl vinyl ether, vinyl esters such as vinyl acetate and vinyl benzoate, vinyl pyridine, vinyl chloride, vinylidene chloride, vinyl carbazole, vinyl pyrrolidone, methyl vinyl ketone, ethylene, propylene, n-butene, isobutylene, dimethyl maleate, and many others.

The process of this invention is most conveniently carried out in a sealed vessel from which residual air and moisture has been removed. The mixed solvent medium, monomeric materials and catalyst are then charged, in any order, and the polymerization is then carried out with efficient agitation. Reaction control is effected by applying heat and or cooling to maintain the reaction temperature at a point below about 90° C. most preferably between about 25 and 75° C. In general, use of a solvent-soluble peroxygen-type catalyst such as any of the organic peroxides, hydroperoxides, and the like, is preferred. The polymerization medium preferably is dry, that is, low in moisture content, although anhydrous conditions are not required. However, even quite small amounts of water (i.e. 1.0 to 1.5% by weight on the monomers) can render the polymer sticky and the final slurry unpredictable as to particle size and viscosity characteristics. The reaction usually will require from about 1 to about 24 hours for completion.

In some cases it is desirable to "seed" the reaction by recycling a small portion (i.e. less than about 10% by volume) of the reaction mixture from a previous run. The latter procedure insures prompt starting of the reaction and seems to reduce build-up on the reactor wall surfaces. However, build-up seemingly is inherently minimized by the use of a fairly dry, mixed solvent medium, under conditions of vigorous agitation although the reason for this is obscure. "Seeding" is conveniently carried out in commercial scale production simply by failing to wash out the last traces of slurry in the reactor from the preceding run.

The course of the reaction in the mixed medium is about the same as a corresponding reaction carried out in pure aromatic hydrocarbon except that the greater fluidity of the reaction mixture renders temperature control more precise. Furthermore, little difficulty is encountered in carrying the reaction to completion with essentially complete conversion of monomer to polymer. In other words, reaction rate and conversion are unaffected by the mixed solvent medium. Following completion of the reaction the fluid slurry is easily filtered and washed either on a plate and frame type of filter press, vacuum filter or in a centrifuge or other conventional apparatus. Filtration rates are much higher and the final wet cake will be found to contain 50% or more less absorbed solvent. Drying of the filter cake is also facilitated and the load on the dryer solvent recovery system is correspondingly lower.

The mixed solvent medium recovered in the filtration step can be recycled as such providing the previous polymerization reaction had been carried to essential completion and the moisture content is not too high. Incomplete reactions leave highly variable amounts of unconsumed monomers, low soluble polymer, catalyst, etc. making reproducible repeat polymerization runs difficult. However, in many of the mixed solvent systems utilizable herein the two solvents form azeotropic or constant boiling mixtures on simple reflux distillation. In most cases the azeotropic boiling mixture can be recycled as such with only minor addition of one or the other of the solvents in order to adjust the composition of the polymerization medium at the desired value.

A particularly desirable mode of operation, when benzene and 1 to 4 carbon atom alcohol mixtures are employed in the polymerization of acrylic acid, is to recycle the solvent to the polymerization step as a benzene/ alcohol azeotropic mixture while adding the acrylic acid monomer in the form of a solution in dry benzene. In the process for producing glacial acrylic acid from acrylonitrile, the last step of the process is an azeotropic dehydration step wherein a mixture of benzene and wet acrylic acid is distilled, driving off the water/benzene azeotrop leaving a solution of glacial acrylic acid in benzene. Suitable proportions of the benzene/alcohol and benzene/ acrylic acid solutions can be blended to achieve the desired mixed benzene/alcohol mixture. Such a process enjoys minimum solvent recovery costs.

The invention will now be more fully described in a number of specific examples illustrating the use of various mixed solvent systems of the invention, the employment of various monomeric mixtures therein, and modes of operation at various total solids levels. Such examples are intended as being illustrative only.

Example 1

In this example, a cross linked, high-swelling copolymer of acrylic acid and a hexaallyl polyether of sucrose (i.e. a mixture of polyethers containing an average of about 6 allyl ether groupings per molecule). In this case acetic acid is employed as the polar organic additive at 12% and 20% solids levels. A number of charges are run in small beverage bottles, the materials listed below being charged to a dry, nitrogen-flushed bottle which is then capped and then secured in a rotatable rack which is immersed in a 50° C. constant temperature water bath. The bottles are rotated by the rack in an end-over-end fashion. For purposes of comparison experiment (F) is included as a control. Experiment F, it should be noted, is at a 10% solids level since it is found impossible to operate without acetic acid at either 12% or 20% by weight solids levels. Experiment F produces a thick, quite viscous slurry which has very low settling and filtration rates and which is found to contain a very fine, highly charged polymer which is difficult to handle in the filtering and drying steps. The remaining experimental runs produce workable slurries (even at 20% solids) which are easier to handle, filter and dry. The amount of acetic acid is varied from about 2.5% to 5% by volume at the 12% solids level and from 8.5% to 9% by volume at the 20% level.

The procedure employed in working up these charges is standardized to enable the determination of swelling indices on the polymers. It is to be understood that wherever a swelling index is listed hereinafter that the following standard procedure has been utilized in its determination. The bottle is opened and is poured into a suction filter fitted with a laboratory paper filter disc and operated by a water aspirator. When all the mother liquor has been sucked out a rubber filter dam is laid over the filter cake and suction continued for a standard time of three minutes to express residual liquor. Then a standard weight aliquot of the wet filter cake is weighed into a small aluminum dish which is then dried in a vacuum oven at 50° C. to constant weight. The swelling index is then calculated by the formula:

$$\frac{\text{Weight of wet cake}}{\text{Weight of dry cake}} = \text{swelling index}$$

Portions of each of the dry polymers, including the control, are then converted to 0.5% aqueous mucilage by suspending the polymer in water containing sufficient NaOH for 60% neutralization of the carboxyl groups of the polymer and then gently mixing until a smooth, creamy mucilage is obtained. The polymerization recipes, yield data swelling indices and mucilage viscosity values (as determined on the Brookfield viscometer, model RVF, at 10 r.p.m.) are summarized below:

| Experiment No. | A | B | C | D | E | F |
|---|---|---|---|---|---|---|
| Acrylic acid (glacial)_____g__ | 40 | 40 | 24 | 24 | 24 | 20 |
| Allyl sucrose [1]_____g__ | 0.4 | 0.4 | 0.24 | 0.24 | 0.24 | 0.2 |
| Benzoyl peroxide_____g__ | 0.8 | 0.8 | 0.4 | 0.4 | 0.4 | 0.4 |
| Acetic acid (glacial)_____cc__ | 17 | 18 | 5 | 7 | 10 | _____ |
| Benzene_____ | ([2]) | ([2]) | ([2]) | ([2]) | ([2]) | ([2]) |
| Yield_____percent__ | 100 | 100 | 100 | 100 | 100 | 100 |
| Swelling Index_____ | 3.64 | 3.71 | 4.7 | 4.92 | 4.76 | 5.2 |
| Mucilage Viscosity, cps_____ | 120,000 | 78,400 | 48,000 | 78,400 | 64,000 | 19,000 |

[1] Hexaethyl hexaether of sucrose, described above.
[2] To total volume of 200 cc.

It should be noted that even at 12 and 20% solids levels the swelling index of the polymer is markedly lower than that of the 10% control (Experiment F).

Example 2

The procedure of Example 1 is repeated employing methanol as the polar organic additive at a 12% by weight solids level. The recipe employed is as follows:

| | Parts |
|---|---|
| Acrylic acid (glacial) | 12 |
| Allyl sucrose (see Ex. 1) | 0.12 |
| Methanol | Variable |
| Benzene to total 100 cc. | |
| Benzoyl peroxide | 0.2 |
| Temp.=50° C. | |
| Time=24 hrs. | |

The amount of methanol is gradually increased in 0.25 cc. increments to follow the effect on swelling index. Several of the polymers obtained are converted to 0.5% aqueous mucilages which are checked for viscosity, as described in Example 1. The data are as follows:

| Cc. Methanol | Swelling Index | Mucilage Viscosity, cps. |
|---|---|---|
| 0 (Control) [1] | 5.2 to 5.5 | 36,000 |
| 0.25 | 5.17 | |
| 0.50 | 4.84 | 51,200 |
| 0.75 | 4.75 | |
| 1.0 | 4.72 | |
| 1.25 | 4.53 | 9,600 |
| 1.50 | 3.72 | |
| 1.75 | 3.88 | |
| 2.0 | 3.65 | |
| 2.25 | 3.12 | |

[1] Control at 10% solids level.

In the above data the experimental slurries made with 1.25% to 1.50% by volume of methanol are adjudged to be the most fluid and the polymers therein to be the most easily filtered and dried. Thus methanol is several times more effective than the acetic acid of Example 1. As will appear in the next example, methanol is shown to be even more effective at the 20% level.

Example 3

The procedure of the preceding examples is repeated employing methanol at the 20% by weight solids level. The polymerization mixture employed has the following composition:

| | parts/wt. |
|---|---|
| Acrylic acid (glacial) | 20 |
| Allyl sucrose (see Ex. 1) | 0.06 |
| Benzoyl peroxide | 0.40 |
| Methanol | cc__ 4.5 |
| Benzene to make a total of 100 cc. | |

The polymerization carried out at 50° C. results in a complete conversion of monomer to a granular polymer that is obtained as a fairly fluid, easily handled slurry. The swelling index of this polymer is only 2.84 as against 5.2–5.5 for a typical 10% control made without methanol.

Example 4

The procedure of Example 1 is repeated employing ethanol as a non-toxic replacement for methanol. The recipe for a 12% solids level is as follows:

| | Parts/wt. |
|---|---|
| Glacial acrylic acid | 12 |
| Allyl sucrose (see Ex. 1) | 0.12 |
| Benzoyl peroxide | 0.20 |
| Ethanol | Variable |
| Benzene to total of 100 cc. | |

The ethanol additive is varied in the above experiments resulting in swelling indices and 0.5% mucilage viscosities as listed below:

| Cc. Ethanol | Swelling Index | Mucilage Viscosity, cps. (10 r.p.m.) |
|---|---|---|
| 0 | 5.2–5.5 | 44,800 |
| 1.5 | 4.92 | 68,800 |
| 2.0 | 4.8 | |
| 2.5 | 4.5 | |
| 3.0 | 4.6 | |
| 3.5 | 4.7 | |
| 4.0 | 4.8 | |
| 4.5 | 4.08 | 33,600 |
| 5.0 | 3.65 | |
| 5.5 | 3.5 | |
| 6.0 | 2.8 | |

Of the above, the experiment carried out with about 4.5 volume percent of ethanol is about the best slurry to handle. It should be noted that the mucilage viscosity is of the same order as that of the control.

Example 5

The procedure of Example 4 is repeated but at the 20% by weight solids level. The recipe and data are as follows:

| | |
|---|---|
| Glacial acrylic acid | parts/wt__ 20 |
| Allyl sucrose (see Ex. 1) | do____ 0.15 |
| Benzoyl peroxide | do____ 0.40 |
| Ethanol | Variable |
| Benzene to 100 cc. total vol. | |
| Temp. | ° C__ 50 |

| Cc. Ethanol | Swelling Index | Mucilage Viscosity, cps. (10 r.p.m.) |
|---|---|---|
| 0 | 5.2–5.5 | 14,400 |
| 3.5 | 3.39 | 36,800 |
| 4.0 | 3.25 | |
| 4.5 | 3.27 | |
| 5.0 | 3.01 | 20,800 |
| 5.5 | 3.18 | |
| 6.0 | 2.88 | |
| 6.5 | 2.98 | |
| 7.5 | 3.02 | |
| 8.5 | 3.0 | |
| 10.0 | 2.93 | |

Of all these, the experiments containing from about 5 to 6% by volume of ethanol produce slurries which are the easiest to work with.

Example 6

In this example, the procedure of Example 4 is repeated employing ethanol as the polar organic additive at the 12% by weight solids levels but varying the type of cross-linking agent. The recipe employed is as follows:

| | |
|---|---|
| Glacial acrylic acid | parts/wt__ 12 |
| Cross-linking monomer (several) | do____ 0.12 |
| Benzoyl peroxide | do____ 0.2 |
| Ethanol | cc__ 5 |
| Benzene to total volume of 100 cc. | |
| Temp. | ° C__ 50 |

The cross-linking monomers and the swelling indices of the polymers produced are as follows:

Cross-linking monomer: Swelling index
    Allyl sucrose (see Ex. 1) (control) _____ 5.2–5.5
    Allyl pentaerythritol [1] _____ 3.92
    Tetravinyl silane _____ 3.84
    1,8-nonadiene _____ 3.36
    3,9-divinyl spirobi _____ 3.60

[1] A polyallyl polyether of pentaerythritol containing an average of 3.8 allyl ether groups per molecule.

Example 7

The procedure of Example 4 is repeated employing toluene and xylene, respectively, as replacements for benzene in a mixed solvent medium containing ethanol as the polar organic additive. The solids level is 12% by weight. The experiments, the materials, swelling indices, etc. are listed below:

| Experiment No. | A | B | C | D | E | F | G | H | I | J |
|---|---|---|---|---|---|---|---|---|---|---|
| Glacial Acrylic Acid _____ g__ | 20 | 24 | 24 | 24 | 24 | 24 | 24 | 24 | 24 | 24 |
| Allyl sucrose (See Ex. 1) ____ g__ | 0.2 | 0.24 | 0.24 | 0.24 | 0.24 | 0.2 | 0.24 | 0.24 | 0.24 | 0.24 |
| Benzoyl peroxide _____ g__ | 0.4 | 0.4 | 0.4 | 0.4 | 0.4 | 0.4 | 0.4 | 0.4 | 0.4 | 0.4 |
| Ethanol _____ cc__ | 0 | 3 | 6 | 9 | 12 | 0 | 3 | 6 | 9 | 12 |
| Xylene | (1) | (1) | (1) | (1) | (1) | | | | | |
| Toluene | | | | | | (1) | (1) | (1) | (1) | (1) |
| Time _____ hours__ | 24 | 24 | 24 | 24 | 24 | 24 | 24 | 24 | 24 | 24 |
| Yield _____ percent__ | 95–100 | 95–100 | 95–100 | 95–100 | 95–100 | 95–100 | 95–100 | 95–100 | 95–100 | 95–100 |
| Swelling Index | 5.0 | 4.4 | 3.96 | 3.16 | 3.0 | 5.0 | 4.58 | 4.16 | 3.49 | 2.89 |

1 To make a total of 200 cc.

In the above experiments it is evident that ethanol is more effective in xylene and toluene than in benzene. It is observed that all of slurries A through D are thin and easy to handle in the work-up procedure. Apparently 6 vol. percent (Experiment E) is slightly too high an ethanol concentration for the 12% solids level in xylene, for it is observed that the polymer in the slurry is slightly swollen and more viscous. In the toluene control at 10% (Experiment F) a slurry is obtained that is thicker and more difficult to filter and handle than any of the 12% experimentals (G to J). Going from G to J the slurries seem to become progressively more fluid. Of these, the slurry of Experiment H is considered the best. It is noted that the polymer in the slurry of Experiment J is very much coarser than the others, the particle of which resemble small beads. It may be advantageous to produce a polymer of the latter sort, having a maximum bulk density, for use in pharmaceutical applications.

*Example 8*

In this example methacrylic acid (glacial) is substituted for the acrylic acid of the foregoing examples and tetrahydrofurane is substituted for the alcohol (or acetic acid) as the polar organic additive. The recipes given below are for 12% and 20% by weight solids levels comparing acrylic acid and methacrylic acid as monomers.

wherein methanol and ethanol are employed, respectively, in the polymerization of pure glacial acrylic acid so as to produce linear polyacrylic acid in the solid, granular form. Polymerizations are conducted at the 12 and 20% by weight levels. The data are as follows:

| Experiment No. | A | B | C | D |
|---|---|---|---|---|
| Glacial Acrylic Acid _____ grams__ | 40 | 40 | 24 | 24 |
| Benzoyl Peroxide _____ do____ | 0.8 | 0.8 | 0.4 | 0.4 |
| Ethanol _____ cubic centimeters__ | 12 | | 10 | |
| Methanol _____ do____ | | 9 | | 3 |
| Benzene | (1) | (1) | (1) | (1) |
| Temp. _____ °C__ | 50 | 50 | 50 | 50 |
| Yield _____ percent__ | 100 | 100 | 100 | 100 |
| Swelling Index | 2.88 | 2.98 | 3.32 | 3.92 |

1 To a total volume of 200 cc.

All of the slurries obtained in the above experiments are easy to handle. Slurries A and B are quite thin and the polymer in each of these cases is beadlike in character. Slurries C and D are lowest in viscosity although slurries A and C are easiest to filter. The polymers obtained are dissolved in water containing NaOH forming solutions highly useful as a textile sizing material.

*Example 10*

In this example, the process of this invention is carried out employing materials and conditions approaching commercial practice. The acrylic acid is added as a solution

| Experiment No. | A | B | C | D | E | F | G | H |
|---|---|---|---|---|---|---|---|---|
| Glacial Acrylic Acid _____ g__ | 40 | 40 | 24 | 24 | 24 | 24 | | |
| Glacial Methacrylic Acid _____ g__ | | | | | | | 40 | 40 |
| Allyl Sucrose (Ex. 1) _____ g__ | 0.4 | 0.4 | 0.24 | 0.24 | 0.24 | 0.24 | | |
| Benzoyl Peroxide _____ g__ | 0.8 | 0.8 | 0.40 | 0.40 | 0.40 | 0.40 | 0.8 | 0.8 |
| Tetrahydrofurane _____ cc__ | 18 | 16 | 4 | 6 | 8 | 10 | 20 | 18 |
| Benzene | (1) | (1) | (1) | (1) | (1) | (1) | (1) | (1) |
| Temp. _____ °C__ | 50 | 50 | 50 | 50 | 50 | 50 | 50 | 50 |
| Time _____ hours__ | 24 | 24 | 24 | 24 | 24 | 24 | 24 | 24 |
| Yield _____ percent__ | (2) | (2) | (2) | (2) | (2) | (2) | (2) | (2) |
| Swelling Index | 3.19 | 3.46 | 5.17 | 4.7 | 4.85 | 4.6 | 3.49 | 3.57 |
| Mucilage Viscosity (cps., 10 r.p.m.) | 21,600 | 21,600 | 35,200 | 28,800 | 21,600 | 21,611 | 40 | 40 |

1 To make a total vol. of 200 cc.
2 C.A. 100.

In all cases the slurries could be agitated and reaction control maintained. However, only recipe A could be poured easily indicating that as much as 10% by volume tetrahydrofuran may be required at the 20% solids levels. It should be noted that in all of Experiments A through F high-swelling polymers of excellent mucilage viscosity are obtained. In experiments G and H, it should be noted, solid, granular, linear polymethacrylic acid soluble in water is obtained.

*Example 9*

In this example several experiments are conducted in benzene containing about 24.9% by weight of glacial acrylic acid. The mixed benzene/ethanol polymerization medium is prepared by combining a benzene/ethanol azeotropic boiling mixture (approximately 65% by volume of benzene and 35% by volume of ethanol boiling at about 68.2° C.) with the acrylic acid solution. The azeotropic mixture duplicates material recovered from the solvent recovery system from a previous run. The reactor is fitted with four 10% radial baffles and the turbine type agitator is operated at 400 r.p.m. The reaction mixture is given below in the as-charged manner and as broken down in parts by weight or volume.

As charged:

| | |
|---|---|
| Acrylic acid solution (24.9% acid in benzene) _____ cc__ | 1740 |
| Azeotropic mixture (35% by vol. ethanol) _____ cc__ | 200 |
| Allyl sucrose (same as in Ex. 1) __grams__ | 2.219 |
| Caprylyl peroxide _____do___ | 1.5 |
| Acrylic acid (glacial) _____ | [1] 100 |
| Allyl sucrose _____ | [1] 0.38 |
| Caprylyl peroxide _____ | [1] 0.34 |
| Ethanol _____ | [1] 12.4 |
| Benzene _____ | [1] 289 |
| Temperature _____° C__ | 60 |
| Time _____hours__ | 2¼ |

[1] Parts by wt./100 parts of monomer.

The product, obtained in 100% yield, is a fast settling, very fluid slurry (viscosity 12 cps.) containing 24.9% by weight of solids. The viscosity of a standard 10% control slurry in pure benzene is of the order of 200 cps. The slurry of this example contains very little fines and filters at a rapid rate. It should be noted that at 10% solids level in benzene with no polar organic additive, the acrylic acid/allyl sucrose monomer system polymerizes to form a slurry having a viscosity of over 200 cps. The swelling index of the experimental polymer is only 2.20. The dried polymer is about 25% more dense than if made at 10% level without a polar additive.

Example 11

The process of Example 10 is repeated employing methanol. Equivalent results are obtained employing only 6.86 parts of methanol per 100 parts by weight of acrylic acid. The slurry viscosity again is about 12 cps. The swelling index of this polymer is only 2.88. Dried polymer obtained from this slurry is about twice as dense as a 10% control made in pure benzene.

In repeat experiments conducted by the procedure of Examples 10 and 11, it is established that the polymers obtained with methanol or ethanol contain very materially reduced absorbed solvent. Experiments conducted wherein the polymer is dried to constant weight confirm this. Tabulated below are values of absorbed solvent content for a low cross-linked (0.25% allyl sucrose) and high cross-linked (0.05% allyl sucrose) polymers intended for mucilaginous applications, together with values for a corresponding control polymer made in pure benzene:

| Polymer: | Lbs. solvent/lb. resin |
|---|---|
| Low allylsucrose (ethanol) _____ | 1.20 |
| High allylsucrose (ethanol) _____ | 1.55 |
| Low allylsucrose (methanol) _____ | 1.44 |
| (Control) [1] _____ | 4.10 |

[1] 10% solids level, no polar additive.

Example 12

In this example, a carboxyl-containing monomer outside the scope of this convention, maleic anhydride, is tested in benzene/ethanol and benzene/methanol mediums. The recipes are as follows:

| Experiment No. | A | B | C | D | E (Control) |
|---|---|---|---|---|---|
| Maleic Anhydride_____g__ | 12.56 | 12.56 | 12.56 | 12.56 | 12.56 |
| Methyl Vinyl Ether_____g__ | 7.44 | 7.44 | 7.44 | 7.44 | 7.44 |
| Allyl Sucrose (Ex. 1)___g__ | 0.2 | 0.2 | 0.2 | 0.2 | 0.2 |
| Benzoyl Peroxide_____g__ | 0.3 | 0.3 | 0.3 | 0.3 | 0.3 |
| Ethanol_____cc__ | 8 | 10 | | | |
| Methanol_____cc__ | | | 2 | 3 | |
| Benzene_____cc__ | 180 | 180 | 180 | 180 | 180 |
| Temp._____°C__ | 50 | 50 | 50 | 50 | 50 |
| Time_____hours__ | 24 | 24 | 24 | 24 | 24 |
| Yield_____percent__ | ([1]) | ([1]) | ([1]) | ([1]) | ([1]) |
| Swelling Index_____ | 4.87 | | 5.35 | 5.06 | 4.62 |

[1] C. A. 100.

It was observed that all slurries except (C) were thin, the control (E) being gas fluid or more fluid than the others. As shown by the swelling index values the mixed medium increase the swelling indices over that obtained in pure benzene. The above experiments are repeated substituting tetrahydrofurane in a wide range of proportions for the alcohol additive. The results are the same or worse. It may be that the maleic anhydride polymer is esterified in the mixed medium. In any case, it would appear that the mixed solvent medium does not have a deswelling effect on the polymers of maleic anhydride.

Example 13

In this example, a high molecular weight linear polyacrylic acid is made by polymerizing glacial acrylic acid in a mixed benzene/methanol medium. The reaction mixture added to nitrogen-purged reactor consists in 1800 ml. of an "extract" solution obtained from the process of producing acrylic acid from acrylonitrile (the "extract" containing 24.9% by weight of glacial acrylic acid and the remainder dry benzene), 100 ml. of dry benzene, 120 ml. of a benzene/methanol azeotropic mixture (C.A. 42% by volume methanol) and 1.50 grams of caprylyl peroxide. The resulting mixture is subjected to moderately vigorous agitation while controlling the mixture at 60° C. In about 125 minutes it is determined that the reaction is complete (100% conversion). Samples of the slurry taken at this point show great fluidity and when allowed to stand show rapid settling rates. The slurry is then easily filtered on a laboratory style open suction filter. It should be noted that the solids content of this charge is nearly 20% by weight.

Examination of the linear polyacrylic acid of Example 13 shows it to be very high in molecular weight, as shown by an intrinsic viscosity of 3.309. Actually, the purpose of the above experiment is to prepare a low molecular weight product having an I.V. of about 1.0 or less, the experiment having been run at 60° C. to accomplish this result. This experiment shows the tendency of the mixed benzene/alcohol medium to produce polymers of very materially increased molecular weights. Normally, in pure benzene acrylic acid homopolymerizes at 50-60° C. to an I.V. of about 1.0, and it is possible to operate at not more than 10% solids level. In water, acrylic acid goes to high molecular weight, but a 10% solution of a polymer having an I.V. of 3.3 would have a consistency of heavy honey and would be most difficult to handle. Drying such a heavy syrup would also be most difficult.

Example 14

In this example, linear polyacrylic acid is made by polymerizing glacial acrylic acid in a mixture of dry benzene and acetonitrile at 50° C. A series of experiments are conducted wherein in each case a mixture of 40 grams of acrylic acid, a variable small amount of acetonitrile and 0.8 gram of benzoyl peroxide is made up to a total volume of 200 ml. by addition of dry benzene (approximately 20% solids level). These mixtures are then agitated for 72 hours and then worked up as described in Example 1. The swelling indices of the polymer are determined on slurry samples as follows:

| | A | B | C |
|---|---|---|---|
| Acetonitrile_____ml__ | 10 | 12 | 14 |
| Swelling Index_____ | 3.15 | 3.31 | 3.25 |

The slurry in each case, is observed to be easily capable of filtration and is easily removed from the reaction vessel.

We claim:

1. A method of preparing a fluid slurry of a solid granular polymer by polymerizing a monomeric material consisting of an acid selected from the class consisting of acrylic acid and methacrylic acid and from 0 to 30% by weight, based on the weight of said acid of a monomer copolymerizable therewith containing at least two $CH_2=C<$ groups per molecule, said method comprising mixing said monomeric material with a liquid organic medium, in which said monomeric material is soluble and its polymers insoluble, consisting of (1) a liquid aromatic hydrocarbon containing less than 10 carbon atoms per molecule, (2) a volatile liquid selected from the class consisting of a lower aliphatic monocarboxylic acid containing not more than 4 carbon atoms, a lower aliphatic monohydric alcohol containing not more than 4 carbon atoms, acetone, dioxane, tetrahydrofurane and acetonitrile and (3) a peroxygen catalyst soluble in said medium, the proportion of said monomeric material so mixed being from 12 to 30% by weight based on the weight of said medium and the proportion of (2) being sufficient to deswell the polymer produced therein by at least 5%, as determined by the change in the ratio of the weight of a wet filter cake of said polymer compared to the weight of the same filter cake when dried, and carrying to essential completion the polymerization of said monomeric material in said medium at a temperature of 25 to 90° C. and while agitating said medium and maintaining therein less than about 1% by weight of water, based on the weight of said monomeric material, thereby to produce a slurry of solid, granular polymer having greater fluidity than a corresponding slurry made at 10% solids in said aromatic hydrocarbon as the sole reaction diluent.

2. A method as defined in claim 1 wherein said organic medium contains less than about 1% by weight of water, based on the weight of said monomeric material and contains sufficient of said solvent to produce a swelling index below about 4.5.

3. A method as defined in claim 1 wherein said acid is acrylic and said (2) is tetrahydrofurane.

4. A method as defined in claim 1 wherein said acid is acrylic and said (2) is dioxane.

5. A method as defined in claim 1 wherein said acid is glacial acrylic acid and said (2) is acetic acid.

6. A method of preparing a fluid slurry of a solid, granular polymer by polymerizing a monomeric material consisting of glacial acrylic acid and from 0 to 30%/wt., based on said acrylic acid, of a monomer copolymerizable with said acrylic acid and containing at least two $CH_2=C<$ groups per molecule, which method comprises mixing said monomeric material with a liquid organic medium consisting of (1) benzene, (2) from 0.5 to 6%/volume, based on said benzene, of a 1 to 4 carbon atom aliphatic monohydric alcohol, and (3) a peroxygen catalyst soluble in said medium, the proportion of said monomeric material so mixed being from 12 to 30% by weight based on the weight of said medium, and carrying to essential completion the polymerization of said monomeric material in said medium at a temperature of 25 to 75° C. and while agitating said medium and maintaining therein less than about 1%/wt. of water, based on the weight of said monomeric material, thereby to produce a slurry of solid, granular polymer having greater fluidity than a corresponding slurry made at 10% solids level in benzene as the sole reaction diluent.

7. A method as defined in claim 6 wherein said monomer copolymerizable with said acrylic acid is a polyalkenyl polyether of a polyhydric alcohol containing more than two alkenyl ether groupings per molecule.

8. A method of preparing a fluid slurry of a solid, granular form of linear, polyacrylic acid comprising mixing a monomeric material consisting of glacial acrylic acid with a dry, organic liquid medium consisting of benzene, from 0.5 to 6%/wt., based on said acrylic acid, of a 1 to 4 carbon atom aliphatic monohydric alcohol, and a peroxygen catalyst soluble in the resulting mixture, the proportion of said monomeric material so mixed being from 12 to 30% by weight based on the total weight of said benzene and said alcohol, and carrying the polymerization of said monomeric material to essential completion in said resulting mixture at 25 to 75° C. and while agitating said medium and maintaining therein less than about 1%/wt. of water, thereby to produce a slurry of a solid, granular form of linear polyacrylic acid having a fluidity greater than a corresponding slurry prepared at the 10% solids level in benzene as the sole reaction diluent.

9. A method of preparing a fluid slurry of a solid, granular polymer by polymerizing a monomeric material consisting of glacial acrylic acid and from 0 to 30%/wt., based on said acrylic acid, of a monomer copolymerizable with said acrylic acid and containing at least two $CH_2=C<$ groups per molecule, which method comprises mixing (1) a solution of said monomeric material in benzene with (2) an azeotropic boiling mixture of benzene and a 1 to 4 carbon atom aliphatic monohydric alcohol, the proportions of (1) and (2) so mixed being such that the proportion of said monomeric material in the resulting mixture is from 12 to 30% by weight based on the total weight of said benzene and said alcohol, carrying the polymerization of said monomeric material to essential completion in the resulting mixture at 25 to 75° C. and while agitating said medium and maintaining therein less than about 1%/wt. of water, thereby to produce a slurry of a solid, granular form of polymer having a fluidity greater than a corresponding slurry prepared at the 10% solids level in benzene as the sole reaction diluent.

10. A method as defined in claim 6 wherein said alcohol is methanol.

11. A method as defined in claim 6 wherein said alcohol is ethanol.

12. A method as claimed in claim 9 wherein said alcohol is methanol, and the resulting reaction mixture is efficiently agitated while polymerization is occurring.

References Cited in the file of this patent

UNITED STATES PATENTS

| | | |
|---|---|---|
| 2,482,056 | Elwell | Sept. 13, 1949 |
| 2,570,861 | Roedel | Oct. 9, 1951 |
| 2,675,370 | Barrett | Apr. 13, 1954 |
| 2,798,053 | Brown | July 2, 1957 |
| 2,823,140 | Lowell | Dec. 30, 1958 |
| 2,858,281 | Bauman | Oct. 28, 1958 |